United States Patent
Lin et al.

(10) Patent No.: US 8,174,493 B2
(45) Date of Patent: May 8, 2012

(54) ELECTROPHORESIS DISPLAY PIXEL AND DISPLAY APPARATUS

(75) Inventors: Hsiang-Lin Lin, Changhua County (TW); Chia-Hsun Tu, Taichung (TW); Chih-Jen Hu, Hsinchu (TW); Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 365 days.

(21) Appl. No.: 12/638,959

(22) Filed: Dec. 15, 2009

(65) Prior Publication Data

US 2011/0095971 A1    Apr. 28, 2011

(30) Foreign Application Priority Data

Oct. 28, 2009    (TW) ................ 98136505 A

(51) Int. Cl.
G09G 3/34    (2006.01)
(52) U.S. Cl. .................................................. 345/107
(58) Field of Classification Search .............. 345/107, 345/214; 359/296
See application file for complete search history.

(56) References Cited

U.S. PATENT DOCUMENTS

| | | | |
|---|---|---|---|
| 6,724,521 B2 | 4/2004 | Nakao et al. | |
| 7,142,351 B2 | 11/2006 | Chung et al. | |
| 7,259,745 B2 * | 8/2007 | Hamaguchi | 345/107 |
| 7,492,505 B2 | 2/2009 | Liang et al. | |
| 7,542,024 B2 * | 6/2009 | Koyama | 345/107 |
| 2008/0158143 A1 | 7/2008 | Kim et al. | |
| 2009/0251456 A1 * | 10/2009 | Koyama | 345/214 |

FOREIGN PATENT DOCUMENTS

CN    1908794    2/2007

OTHER PUBLICATIONS

"First Office Action of China Counterpart Application", issued on Mar. 15, 2011, p. 1-p. 6.

* cited by examiner

*Primary Examiner* — Fred Tzeng
(74) *Attorney, Agent, or Firm* — Jianq Chyun IP Office

(57) ABSTRACT

An electrophoresis display pixel including an electrophoresis display film, a substrate, a first active device, a second active device, a first electrode, and a second electrode is provided. The substrate is disposed on the electrophoresis display film, and the substrate has a transparent region and a non-transparent region. The first active device and the second active device are disposed on the substrate and located in the non-transparent region. The first electrode is disposed on the substrate, located in the transparent region, and electrically connected to the first active device. The second electrode is disposed on the substrate, located in the non-transparent region, and electrically connected to the second active device. A light passes through the transparent region and enters the electrophoresis display film to be displayed. A display apparatus including the abovementioned electrophoresis display pixel is also provided.

13 Claims, 4 Drawing Sheets

ELECTROPHORESIS DISPLAY PIXEL AND DISPLAY APPARATUS

CROSS-REFERENCE TO RELATED APPLICATION

This application claims the priority benefit of Taiwan application serial no. 98136505, filed on Oct. 28, 2009. The entirety of the above-mentioned patent application is hereby incorporated by reference herein and made a part of specification.

BACKGROUND OF THE INVENTION

1. Field of the Invention

The invention generally relates to an electrophoresis display pixel and a display apparatus, and more particularly, to an electrophoresis display pixel and a display apparatus having high display contrast ratio.

2. Description of Related Art

Along with the development of flat panel displays (FPD), the characteristics of lighter, thinner and flexible designs are the foremost goal of the display apparatus for the future. The display technologies applied to the flexible display, electronic paper, and the electronic book include the liquid crystal display technology, the electrophoresis display technology, the electrochromic display technology, and the like.

The electrophoresis display includes an active device array substrate and an electrophoresis display film adhered on the active device array substrate. The electrophoresis display film has a display mass material and a plurality of display particles distributed in the display mass material. The display mass material is, for example, a display solution, and the display particles are particles with positive voltage polarity or negative voltage polarity. The active device array substrate includes a plurality of pixel structures, each of which has an active device and a pixel electrode.

A user commonly views the displayed image from a side of the electrophoresis display adjacent to the electrophoresis display film and away from the active device array substrate. That is to say, the active device array substrate is located at a non-display side, and the electrophoresis display film is located at a display side. The electrophoresis display displays images by applying different voltages to the pixel electrodes through the active devices disposed on the active device array substrate such that the electric field inside the electrophoresis display film is changed to drive the movement of the display particles. The display particles are used to reflect the ambient light. Therefore, the color of the display particles is presented when the display particles move toward the display side, and the color of the display mass material is presented when the display particles move away from the display side.

SUMMARY OF THE INVENTION

The invention is directed to an electrophoresis display pixel having high display contrast ratio.

The invention is directed to a display apparatus having a plurality of electrophoresis display pixels having high display contrast ratio.

The invention provides an electrophoresis display pixel including an electrophoresis display film, a substrate, a first active device, a second active device, a first electrode, and a second electrode. The substrate is disposed on the electrophoresis display film, and the substrate has a transparent region and a non-transparent region. The first active device and the second active device are disposed on the substrate and located in the non-transparent region. The first electrode is disposed on the substrate, located in the transparent region, and electrically connected to the first active device. The second electrode is disposed on the substrate, located in the non-transparent region, and electrically connected to the second active device. A light passes through the transparent region and enters the electrophoresis display film to be displayed.

In an embodiment of the invention, the first active device and the second active device respectively include a gate, a source, and a drain. The source and the drain are located at two opposite sides of the gate, the first electrode is electrically connected to the drain of the first active device, and the second electrode is electrically connected to the drain of the second active device. The gate, the source and the drain is, for example, made by a material such as a non-transparent conductive material. In addition, the electrophoresis display pixel further includes a capacitor electrode disposed on the substrate and located in the non-transparent region. A material of the capacitor electrode is, for example, a non-transparent conductive material.

In an embodiment of the invention, the electrophoresis display pixel further includes two scan lines and a data line, the first active device and the second active device are respectively electrically connected to one of the scan lines, and the first active device and the second device are both electrically connected to the data line.

In an embodiment of the invention, the electrophoresis display pixel further includes a scan line and two data lines, the first active device and the second active device are both electrically connected to the scan line, and the first active device and the second device are respectively electrically connected to one of the data lines.

In an embodiment of the invention, the electrophoresis display film has an electrode layer, a display mass material, and a plurality of display particles. The display particles are distributed in the display mass material, and the electrode layer and the substrate are located at two opposite sides of the display mass material. The display particles are, for example, controlled by the voltage polarities of the first electrode and the second electrode to be located in the transparent region and the non-transparent region.

The invention further provides a display apparatus including the aforesaid electrophoresis display pixels.

In an embodiment of the invention, the display apparatus includes a electronic paper display or a flexible display panel.

In view of the above, the active device is disposed at the display side in the invention such that the electrophoresis display pixel has non-transparent devices at the display side. When a black image is displayed by the electrophoresis display, the display particles are located under the non-transparent devices and are shielded thereby so as to be conducive to improve the display contrast ratio. Therefore, the electrophoresis display pixels and the display apparatus of the invention have good display effect, e.g. the display contrast ratio is desirable.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
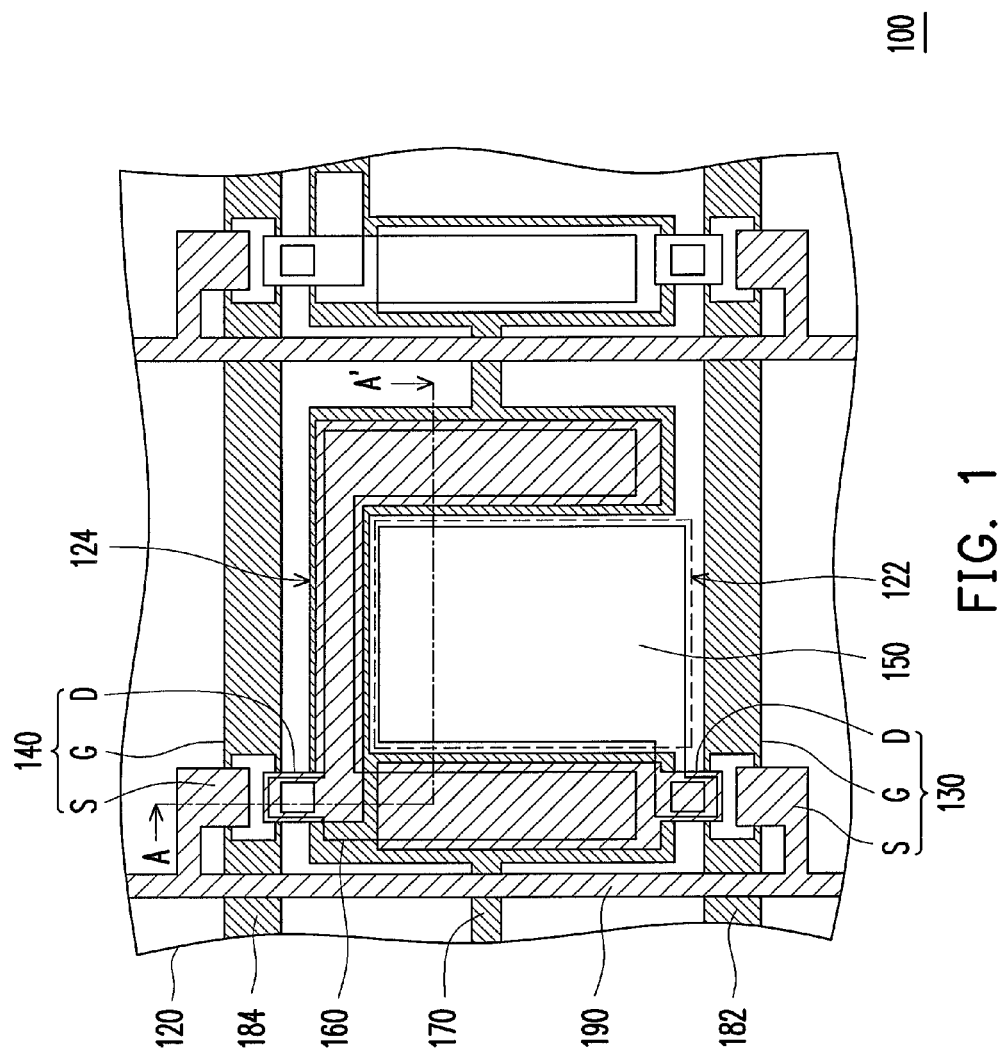
FIG. 1 illustrates a schematic top view of an electrophoresis display pixel according to an embodiment of the invention.
Figure 2:
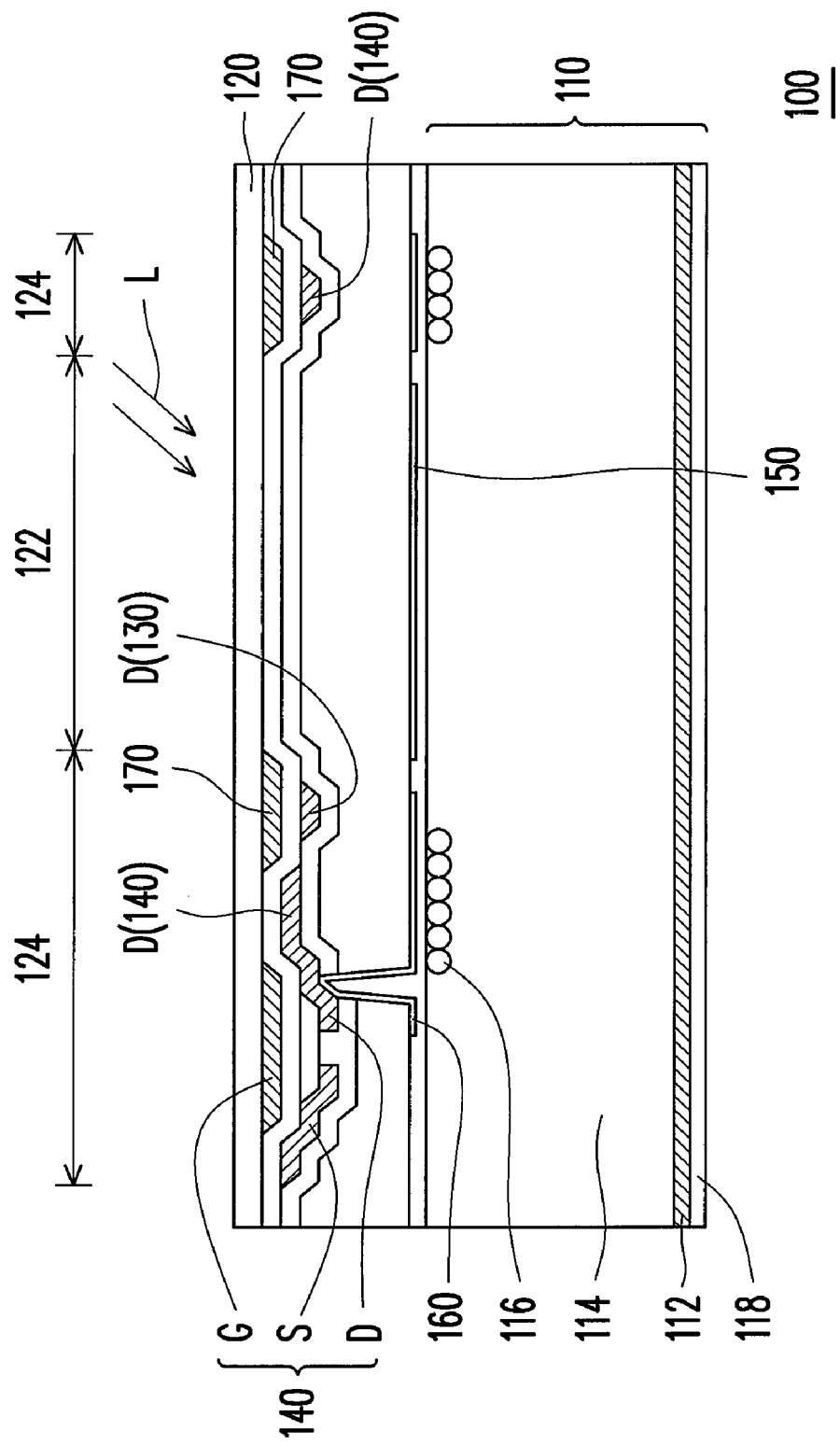
FIG. 2 illustrates a cross sectional view of the electrophoresis display pixel taken along the cutting line A-A' of FIG. 1.

FIG. 1 illustrates a schematic top view of an electrophoresis display pixel according to an embodiment of the invention, and FIG. 2 illustrates a cross sectional view of the electrophoresis display pixel taken along the cutting line A-A' of FIG. 1. Referring to FIG. 1 and FIG. 2, an electrophoresis display pixel 100 includes an electrophoresis display film 110, a substrate 120, a first active device 130, a second active device 140, a first electrode 150, and a second electrode 160. The substrate 120 is disposed on the electrophoresis display film 110, and the substrate 120 has a transparent region 122 and a non-transparent region 124. The first active device 130 and the second active device 140 are disposed on the substrate 120 and located in the non-transparent region 124. The first electrode 150 is disposed on the substrate 120, located in the transparent region 122, and electrically connected to the first active device 130. The second electrode 160 is disposed on the substrate 120, located in the non-transparent region 124, and electrically connected to the second active device 140.

Specifically, the electrophoresis display film 110 has an electrode layer 112, a display mass material 114, and a plurality of display particles 116. The display particles 116 are distributed in the display mass material 114, and the electrode layer 112 and the substrate 120 are located at two opposite sides of the display mass material 114. In the present embodiment, a light L passes through the transparent region 122, enters the electrophoresis display film 110, and is reflected to be displayed. That is to say, the substrate 120 is located at the display side.

In other words, a user using an electronic device having the electrophoresis display pixel 100 is located at the side of the electrophoresis display pixel 100 where the light L is emitted from, and the user views the displayed image in a direction adjacent to or parallel to the irradiating direction of the light L. The material of the first electrode 150 and the second electrode 160 is a transparent conductive material, for example. To improve the display quality, the electrophoresis display pixel 100 further includes a light absorption layer 118 disposed at a side of the electrophoresis display film 110 away from the substrate 120.

Figure 3:
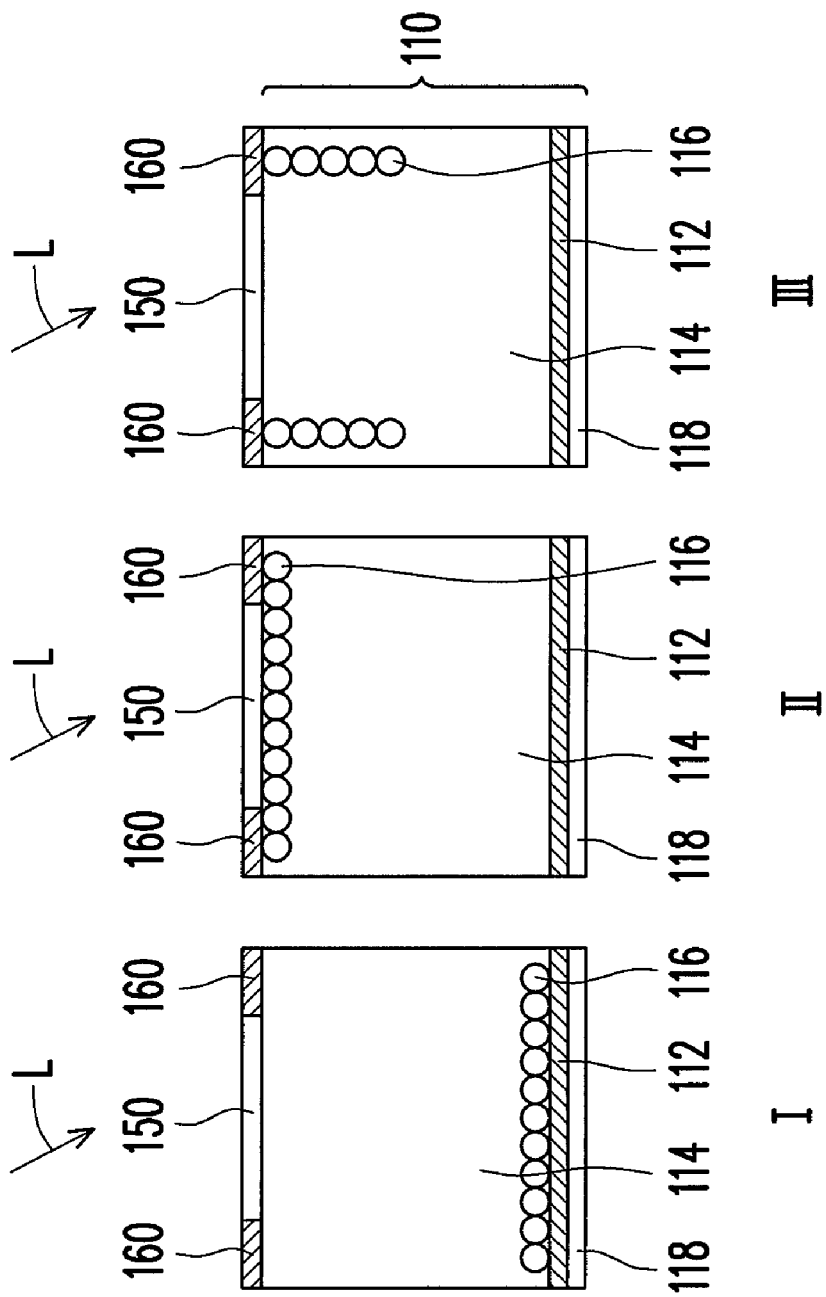
FIG. 3 schematically illustrates three display states of the electrophoresis display pixel shown in FIGS. 1 and 2.

FIG. 3 schematically illustrates three display states of the electrophoresis display pixel shown in FIGS. 1 and 2, wherein FIG. 3 simply illustrates the display film, the first electrode, and the second electrode. Referring to FIG. 3, the display particles 116 are particles having positive polarity or negative polarity so that the movement of the display particles 116 can be driven according to the electric field formed by the electrode layer 112, the first electrode 150, and the second electrode 160.

In the present embodiment, it is assumed that the display particles 116 have positive polarity. In state I, the electrode layer 112 is applied by a negative voltage, and the first electrode 150 and the second electrode 160 are applied by a positive voltage. According to the direction and the distribution of the electric field, the display particles 116 are moved toward the electrode layer 112 and approach a surface of the electrode layer 112. Therefore, the light L passes through the display mass material 114 and then is reflected by the display particles 116. Namely, the user views the color of the display mass material 114 presented by the electrophoresis display pixel 100 in the irradiating direction of the light L under state I. If the color of the display mass material 114 is red, a red image is displayed by the electrophoresis pixel 100 in state I. It is noted that the color of the display mass material 114 can be altered based on different designs.

Similarly, the display particles 116 are assumed to have positive polarity. In state II, the electrode layer 112 is applied by a positive voltage, and the first electrode 150 and the second electrode 160 are applied by a negative voltage. According to the direction and the distribution of the electric field, the display particles 116 are moved toward the first electrode 150 and the second electrode 160 to approach surfaces of the first electrode 150 and the second electrode 160. Under state II, the light L is directly reflected by the display particles 116 without passing through the display mass material 114, and the color of the display particles 116 is displayed. If the color of the display particles 116 is white, the user views a white image displayed by the electrophoresis display pixel 100 in the irradiating direction of the light L in state II. Certainly, along with the changes of the color of the display particles 116, the color of the image displayed by the electrophoresis display pixel 100 is changed in state II. In brief, the user views the image having the color of the display particles 116 in state II.

Furthermore, the display particles 116 are supposed to have positive polarity. In state III, the electrode layer 112 and the first electrode 150 are applied by a positive voltage, and the second electrode 160 is applied by a negative voltage. The display particles 116 having positive polarity are moved to the region where the second electrode 160 is located at according to the direction and the distribution of the electric field. In other words, in addition to move vertically, the display particles 116 can further move transversally in the display mass material 114 by the electric field formed between the first electrode 150 and the second electrode 160.

As shown in FIGS. 1, 2, and 3, the second electrode 160 is located at the non-transparent region 124 such that the light L is not reflected by the display particles 116 and is absorbed by the light absorption layer 116 in state III. Accordingly, when the user views in the direction from the substrate 120 toward the electrophoresis display film 110, the user can see a black image displayed by the electrophoresis display pixel 100. Specifically, the second electrode 160 is located at the non-transparent region 124 in the present embodiment so that the light L is difficultly irradiated on and reflected by the display particles 116 in state III. The electrophoresis display pixel 100 does not reflect the light L during displaying a black image so as to provide the black image with pure blackness. The electrophoresis display pixel 100 thus has high display contrast ratio.

In detail, referring to FIGS. 1 and 2 continuously, the electrophoresis display pixel 100 further includes two scan lines 182 and 184, and a data line 190. The first active device 130 is electrically connected to the scan line 182, the second active device 140 is electrically connected to the scan line 184, and both the first active device 130 and the second active device 140 are electrically connected to the same data line 190. The first active device 130 and the second active device 140 are respectively electrically connected to the scan line 182 and the scan line 184 in the present embodiment. Accordingly, the first electrode 150 and the second electrode 160 may have different voltages to drive the transversal movement of the display particles 116 by respectively connected to the first active device 130 and the second active device 140.

In the present embodiment, the first active device 130 and the second active device 140 respectively include a gate G, and source S and a drain D. The source S and the drain D in the same device are located at two opposite sides of the corresponding gate G, the first electrode 150 is electrically connected to the drain D of the first active device 130, and the second electrode 160 is electrically connected to the drain D of the second active device 140. Besides, the first active device 130 and the second active device 140 are substantially thin film transistors (TFT), for example. A material of the gate G, the source S and the drain D is, for example, a non-transparent conductive material.

In addition, the electrophoresis display pixel 100 further includes a capacitor electrode 170 disposed on the substrate 120 and located in the non-transparent region 124. The drain D of the first active device 130 overlaps with the capacitor electrode 170 and the drain D of the second active device 140 also overlaps with the capacitor electrode 170, which form corresponding storage capacitors. The storage capacitors are conducive to maintain the display stability of electrophoresis display pixel 100. In addition, a material of the capacitor electrode 170 is, for example, a non-transparent conductive material.

The scan lines 182 and 184, the data line 190, the first active device 130, the second active device 140, and the capacitor electrode 170 are non-transparent devices. Therefore, the non-transparent region 124 in the present embodiment is defined by the disposition location of the foregoing non-transparent devices. The non-transparent devices are disposed at the display side, i.e. the side where the substrate 120 is located at or the side adjacent to the user's eyes. The electrophoresis display pixel 100 can shield the undesirable leaking light or obstruct the light L reflected by the display particles 116 located in the non-transparent region 124 by the non-transparent devices so as to improve the display contract ratio of the electrophoresis display pixel 100.

Furthermore, no additional light shielding elements are required to improve the display quality of the electrophoresis display pixel 100. Accordingly, the electrophoresis display pixel 100 can be made by the conventional manufacturing process without complicating the conventional manufacturing process. In addition, the devices used to demarcate the non-transparent region 124 are not restricted. Exemplarily, the devices can be a TFT device, a storage capacitor or any device having at least one non-transparent layer to obstruct or reduce light transmission.

Specifically, the process of manufacturing the electrophoresis display pixel 100 includes, for example, forming the scan lines 182 and 184, the data line 190, the first active device 140, the second active device 140, the first electrode 150, the second electrode 160, and the capacitor electrode 170 on the substrate 120 first by using the film deposition process and the photolithography process applying in the conventional process of manufacturing an active device array substrate. Next, a side of the substrate 120 having the aforesaid devices is adhered onto or assembled with the electrophoresis display film 110. In other words, the process of manufacturing the electrophoresis display pixel 100 is substantially the same as the conventional process.

The components of the electrophoresis display pixel 100 are the same as the components of the conventional electrophoresis display pixel, which means the present embodiment facilitates the high display contrast ratio without adding or changing the components. Therefore, the design of the present embodiment does not complicate the manufacturing process or increase the cost of the manufacturing process. The electrophoresis display pixel 100 can be applied in a display apparatus such as an electronic paper display or a flexible display.

Figure 4:
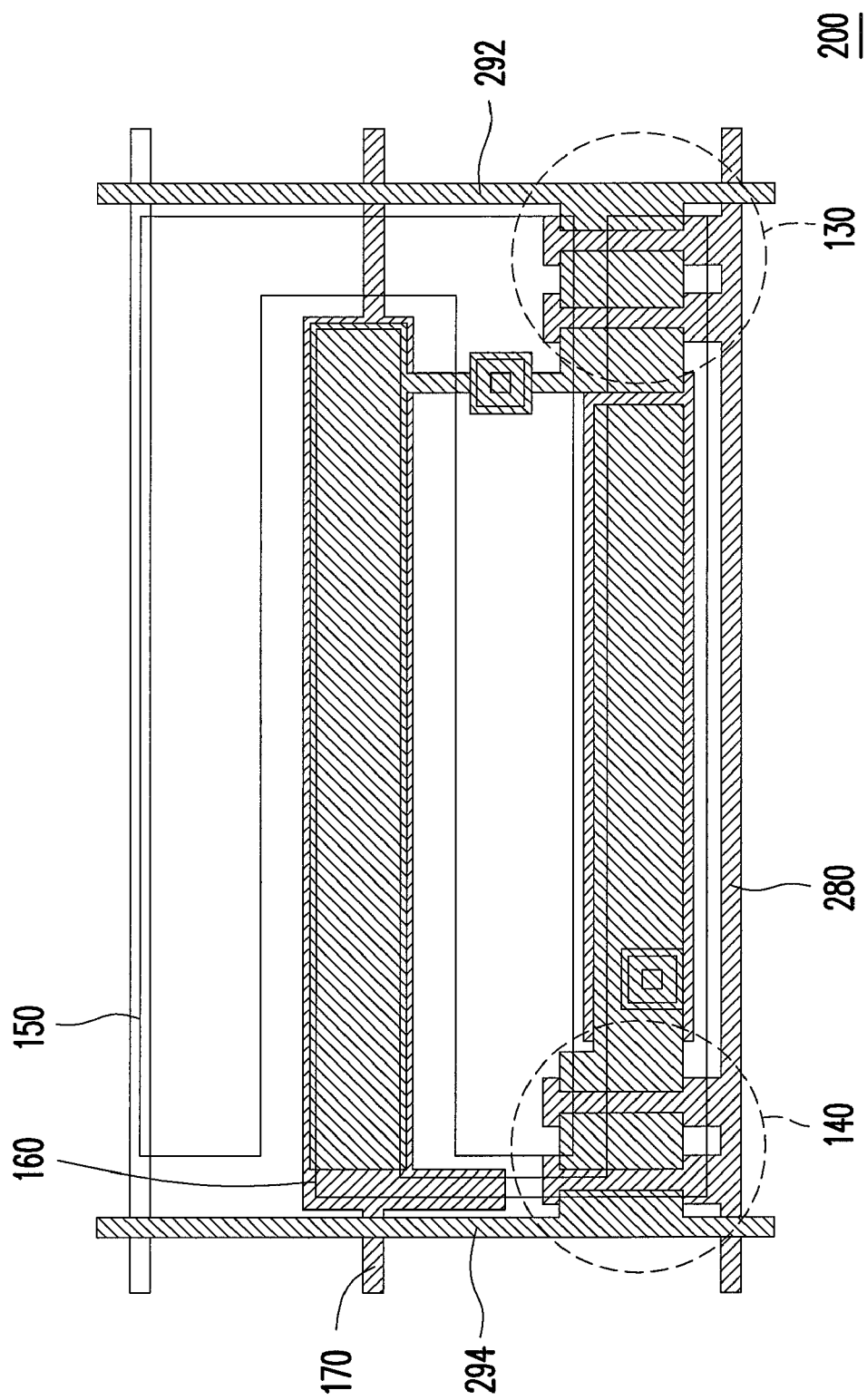
FIG. 4 illustrates a schematic top view of a part of elements of an electrophoresis display pixel according to another embodiment of the invention.

FIG. 4 illustrates a schematic top view of a part of elements of an electrophoresis display pixel according to another embodiment of the invention, wherein the electrophoresis display film and the substrate are omitted. Referring to FIG. 4, in another electrophoresis display pixel 200, the first active device 130 and the second active device 140 are driven by one scan line 280 and two data lines 292 and 294. The first active device 130 and the second active device 140 are electrically connected to the same one scan line 280. In addition, the first active device 130 is electrically connected to the data line 292, and the second active device 140 is electrically connected to the data line 294.

The data line 292 and the data line 294 transmit corresponding signals to the first electrode 150 and the second electrode 160 when the first active device 130 and the second active device 140 are turned on. Accordingly, the voltage polarity of the first electrode 150 and that of the second electrode 160 are decided by independent signals so as to control the moving direction and the position of the display particle (not shown) in the display film (not shown). The non-transparent elements such as the first active device 130, the second active device 140, the capacitor electrode 170 and the like are used to demarcate the non-transparent region in both the present embodiment and the aforesaid embodiment. Furthermore, the second electrode 160 is located in the non-transparent region in both embodiments. Therefore, the display particles (not shown) is drawn to the location where the second electrode 160 is located at when a black image is displayed to prevent from light reflection. The electrophoresis display pixel 200 can display a black image having pure blackness and have higher display contrast ratio.

Similarly, the present embodiment makes the non-transparent elements disposed at the display side adjacent to the user's eyes. The existing non-transparent elements are used to shield the display particles (not shown) when the electrophoresis display pixel 200 displays a black image. Accordingly, the black image displayed by the electrophoresis display pixel 200 is black enough to improve the display contrast ratio thereof.

In summary, the side having the substrate configured with the active device according to the present invention is served as the display side. Therefore, the non-transparent elements such as the active device, the capacitor electrode, and the like demarcate the non-transparent region on the substrate. The first electrode and the second electrode are respectively disposed in the transparent region and the non-transparent region to control the transversal movement of the display particles in the invention. The display particles shielded by the non-transparent elements are incapable of reflecting light so as to facilitate the electrophoresis display pixel to display a blacker image when the display particles are moved toward the location where the second electrode is located at. Accordingly, the electrophoresis display pixel and the display apparatus of the invention have desirable display contrast ratio. The components and the manufacturing method of the electrophoresis display pixel are not largely modified under the invention, that is to say, the effect of high display contrast ratio is accomplished in the electrophoresis display pixel under the conventional components in the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electrophoresis display pixel, comprising:
an electrophoresis display film;
a substrate disposed on the electrophoresis display film, and the substrate having a transparent region and a non-transparent region;
a first active device disposed on the substrate and located in the non-transparent region;
a second active device disposed on the substrate and located in the non-transparent region;
a first electrode disposed on the substrate, located in the transparent region, and electrically connected to the first active device; and
a second electrode disposed on the substrate, located in the non-transparent region, and electrically connected to the second active device,
wherein a light passes through the transparent region and enters the electrophoresis display film to be displayed.

2. The electrophoresis display pixel of claim 1, wherein the first active device and the second active device respectively comprise a gate, a source, and a drain, the source and the drain are respectively located at opposite sides of the gate, the first electrode is electrically connected to the drain of the first active device, and the second electrode is electrically connected to the drain of the second active device.

3. The electrophoresis display pixel of claim 2, wherein a material of the gate, the source, and the drain is a non-transparent conductive material.

4. The electrophoresis display pixel of claim 2, further comprising a capacitor electrode disposed on the substrate and located in the non-transparent region.

5. The electrophoresis display pixel of claim 4, wherein the drain of the first active device and the drain of the second active device are respectively overlapped with the capacitor electrode.

6. The electrophoresis display pixel of claim 4, wherein a material of the capacitor electrode is a non-transparent conductive material.

7. The electrophoresis display pixel of claim 1, further comprising two scan lines and a data line, the first active device and the second active device are respectively electrically connected to one of the scan lines, and the first active device and the second active device are electrically connected to the data line.

8. The electrophoresis display pixel of claim 1, further comprising a scan line and two data lines, the first active device and the second active device are electrically connected to the scan line, and the first active device and the second active device are respectively electrically connected to one of the data lines.

9. The electrophoresis display pixel of claim 1, further comprising a light absorption layer disposed at a side of the electrophoresis display film away from the substrate.

10. The electrophoresis display pixel of claim 1, wherein the electrophoresis display film has an electrode layer, a display mass material, and a plurality of display particles, the display particles are distributed in the display mass material, and the electrode layer and the substrate are located at two opposite sides of the display mass material.

11. The electrophoresis display pixel of claim 10, wherein the display particles are controlled by the voltage polarities of the first electrode and the second electrode to be located in the transparent region or in the non-transparent region.

12. A display apparatus, comprising a plurality of the electrophoresis display pixels as claimed in claim 1.

13. The display apparatus of claim 12, wherein the display apparatus comprises an electronic paper display or a flexible display panel.

* * * * *